United States Patent
Lin

(10) Patent No.: US 11,540,449 B1
(45) Date of Patent: Jan. 3, 2023

(54) GARDENING SHEARS HAVING EFFORT-SAVING STRUCTURE

(71) Applicant: WISE CENTER PRECISION APPLIANCE CO., LTD., Taichung (TW)

(72) Inventor: Thomas Lin, Taichung (TW)

(73) Assignee: WISE CENTER PRECISION APPLIANCE CO., LTD., Taichung (TW)

( * ) Notice: Subject to any disclaimer, the term of this patent is extended or adjusted under 35 U.S.C. 154(b) by 0 days.

(21) Appl. No.: 17/365,370

(22) Filed: Jul. 1, 2021

(51) Int. Cl.
*A01G 3/02* (2006.01)
*A01G 3/047* (2006.01)

(52) U.S. Cl.
CPC ............................... *A01G 3/0475* (2013.01)

(58) Field of Classification Search
CPC . A01G 3/02; A01G 3/08; A01G 3/025; A01G 3/021; A01G 3/0475; B25G 1/04; B26B 13/26; B26B 19/00
USPC ...... 30/224, 186, 134, 135, 123.3, 245–262, 30/192, 193, 266
See application file for complete search history.

(56) References Cited

U.S. PATENT DOCUMENTS

| 8,607,677 B2 * | 12/2013 | Nelson | A01G 3/08 30/186 |
| 10,212,891 B1 * | 2/2019 | Wu | A01G 3/0251 |
| 2010/0223794 A1 * | 9/2010 | Block | B26B 17/006 30/258 |
| 2012/0151781 A1 * | 6/2012 | Huang | A01G 3/0251 30/251 |
| 2019/0001512 A1 * | 1/2019 | Wong | B26B 13/26 |

* cited by examiner

*Primary Examiner* — Ghassem Alie
(74) *Attorney, Agent, or Firm* — Muncy, Geissler, Olds & Lowe, P.C.

(57) ABSTRACT

A gardening shears includes a shank having an elongated groove, a first handle connected to the bottom end of the shank, a first shear blade having a first blade portion and a first shank portion with top end connected to the bottom end of the first blade portion, a second handle connected to the bottom end of the first shank portion, and a second shear blade having a second blade portion and a second shank portion with top end connected to the bottom end of the second blade portion. The first shank portion has an axle assembly located in the elongated groove. The second shank portion is pivotably connected with the first shank portion and the shank by first and second pivot members respectively. When the handles are opened or closed, the axle assembly moves along the elongated groove to change the torque on the handles to save effort.

3 Claims, 6 Drawing Sheets

GARDENING SHEARS HAVING EFFORT-SAVING STRUCTURE

BACKGROUND OF THE INVENTION

1. Field of the Invention

The present invention relates to gardening shears and more particularly, to a gardening shears having an effort-saving structure.

2. Description of the Related Art

In general, the structure of a gardening shears primarily includes a first shear blade and a second shear blade, and the first and second shear blades are pivotably connected with each other. Besides, the bottom ends of the first and second shear blades are each connected with a handle. The user holds the two handles and applies force thereto to make the two handles approach or leave each other, thereby attaining the objective of pruning branches and leaves by the first and second shear blades.

However, when generally using the gardening shears to prune branches and leaves, the user usually has to open and close the two handles repeatedly. When the two shear blades cut a branch relatively larger in diameter, the handles usually have to be repeatedly operated for many times to complete the pruning, so that it is quite effort-consuming and time-consuming for the user to operate the conventional gardening shears.

Therefore, the applicant thinks that if a gardening shears which can achieve an effort-saving effect is provided to save the user effort during operation, it has convenience in use.

SUMMARY OF THE INVENTION

It is a primary objective of the present invention to provide a gardening shears having an effort-saving structure, which can change the torque produced by the force applied on the handles during operation, thereby more effort-saving for the user than the prior art and having convenience in use.

To attain the above objective, the present invention provides a gardening shears having an effort-saving structure, which includes a shank, a first handle, a first shear blade, a second handle, and a second shear blade. The shank is provided near a top end thereof with an elongated groove. The first handle is connected to a bottom end of the shank. The first shear blade has a first blade portion and a first shank portion. A bottom end of the first blade portion is connected with a top end of the first shank portion. The first shank portion is provided near the top end thereof with an axle assembly. The axle assembly is located in the elongated groove of the shank. The second handle is connected to a bottom end of the first shank portion. The second shear blade has a second blade portion and a second shank portion. The second shank portion extends from a bottom end of the second blade portion. A part of the second shank portion located near a top end of the second shank portion is pivotably connected with a part of the first shank portion located near the top end of the first shank portion by a first pivot member. Another part of the second shank portion located near a bottom end of the second shank portion is pivotably connected with the shank by a second pivot member. When the first handle and the second handle are opened or closed, the axle assembly is moved along the elongated groove of the shank, and the first shear blade and the second shear blade are opened or closed accordingly.

As a result, the present invention provides a gardening shears having an effort-saving structure, whose technical feature of the axle assembly moving along the elongated groove of the shank can change the torque produced by the force applied on the handles during operation to save the user effort, thereby having convenience in use.

DETAILED DESCRIPTION OF THE INVENTION

Figure 1:
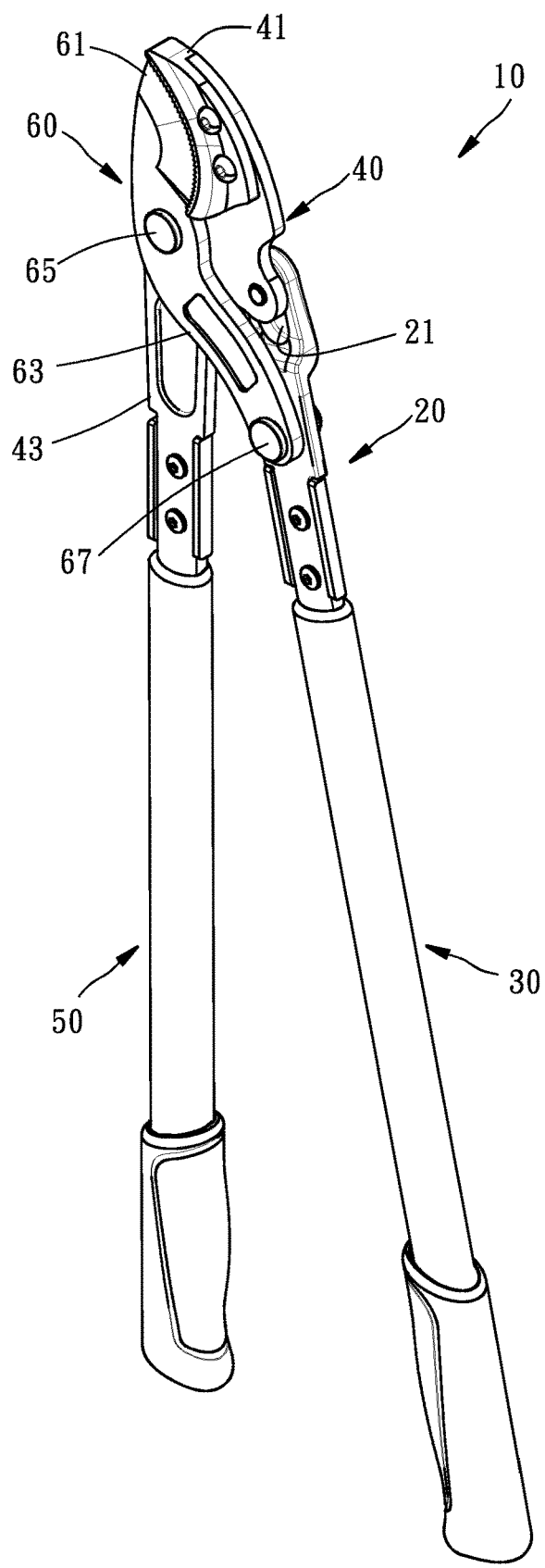
FIG. 1 is a perspective view of a first preferred embodiment of the present invention.

For the detailed description of the technical features of the present invention, the preferred embodiments and the accompanying drawings are given herein below and illustrated in the following, wherein: as shown in FIGS. 1-5, a gardening shears 10 having an effort-saving structure of a first preferred embodiment of the present invention includes a shank 20, a first handle 30, a first shear blade 40, a second handle 50 and a second shear blade 60.

Figure 2:
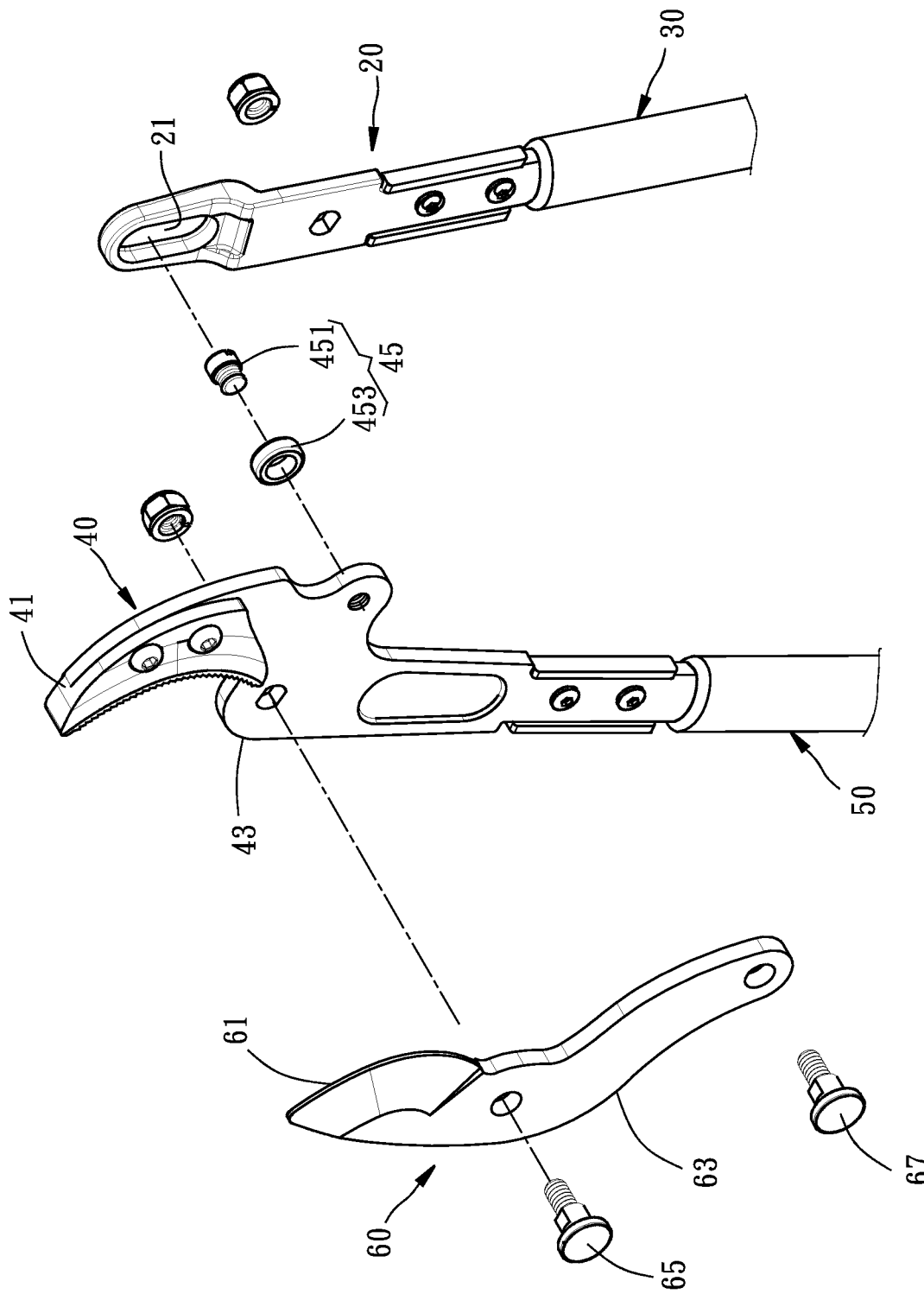
FIG. 2 is an exploded view of the first preferred embodiment of the present invention.

As shown in FIGS. 1-2, the shank 20 is provided near the top end thereof with an elongated groove 21.

The first handle 30 is connected to the bottom end of the shank 20 for the user to hold the first handle 30 and apply force thereto.

The first shear blade 40 has a first blade portion 41 and a first shank portion 43. The bottom end of the first blade portion 41 is connected with the top end of the first shank portion 43. The first shank portion 43 is provided near the top end thereof with an axle assembly 45. The axle assembly 45 is located in the elongated groove 21 of the shank 20. In this preferred embodiment, the axle assembly 45 is composed of a screw member 451 and a ring member 453. The screw member 451 is a threaded rod, and the ring member 453 is made of a wear-resistant material such as metal or ceramic. The screw member 451 is inserted through the ring member 453 and screwed into the first shank portion 43 at a position near the top end of the first shank portion 43 to combine the ring member 453 and the first shank portion 43 together. Meanwhile, the ring member 453 is rotatable relative to the screw member 451, and the diameter of the ring member 453 is a little smaller than the width of the elongated groove 21 so that the ring member 453 is just able to be accommodated in the elongated groove 21.

In other practicable embodiments, the axle assembly 45 may be integrally formed on the first shank portion 43 near the top end of the first shank portion 43.

The second handle 50 is connected to the bottom end of the first shank portion 43 for the user to hold the second handle 50 and apply force thereto.

The second shear blade 60 has a second blade portion 61 and a second shank portion 63. The second shank portion 63 extends from the bottom end of the second blade portion 61. A part of the second shank portion 63 located near the top end of the second shank portion 63 is pivotably connected with a part of the first shank portion 43 located near the top end of the first shank portion 43 by a first pivot member 65, and another part of the second shank portion 63 located near the bottom end of the second shank portion 63 is pivotably connected with the shank 20 by a second pivot member 67.

Figure 3:
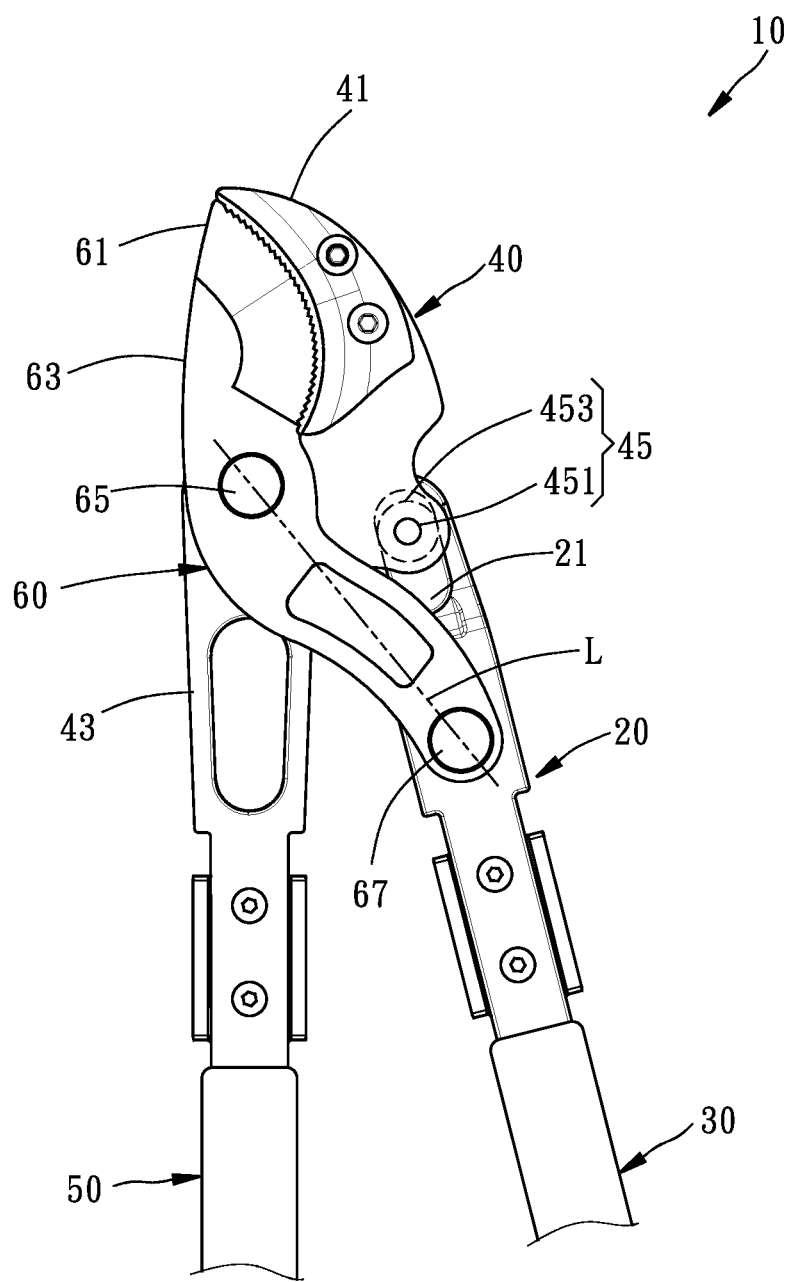
FIG. 3 is a front view of the first preferred embodiment of the present invention.
Figure 4:
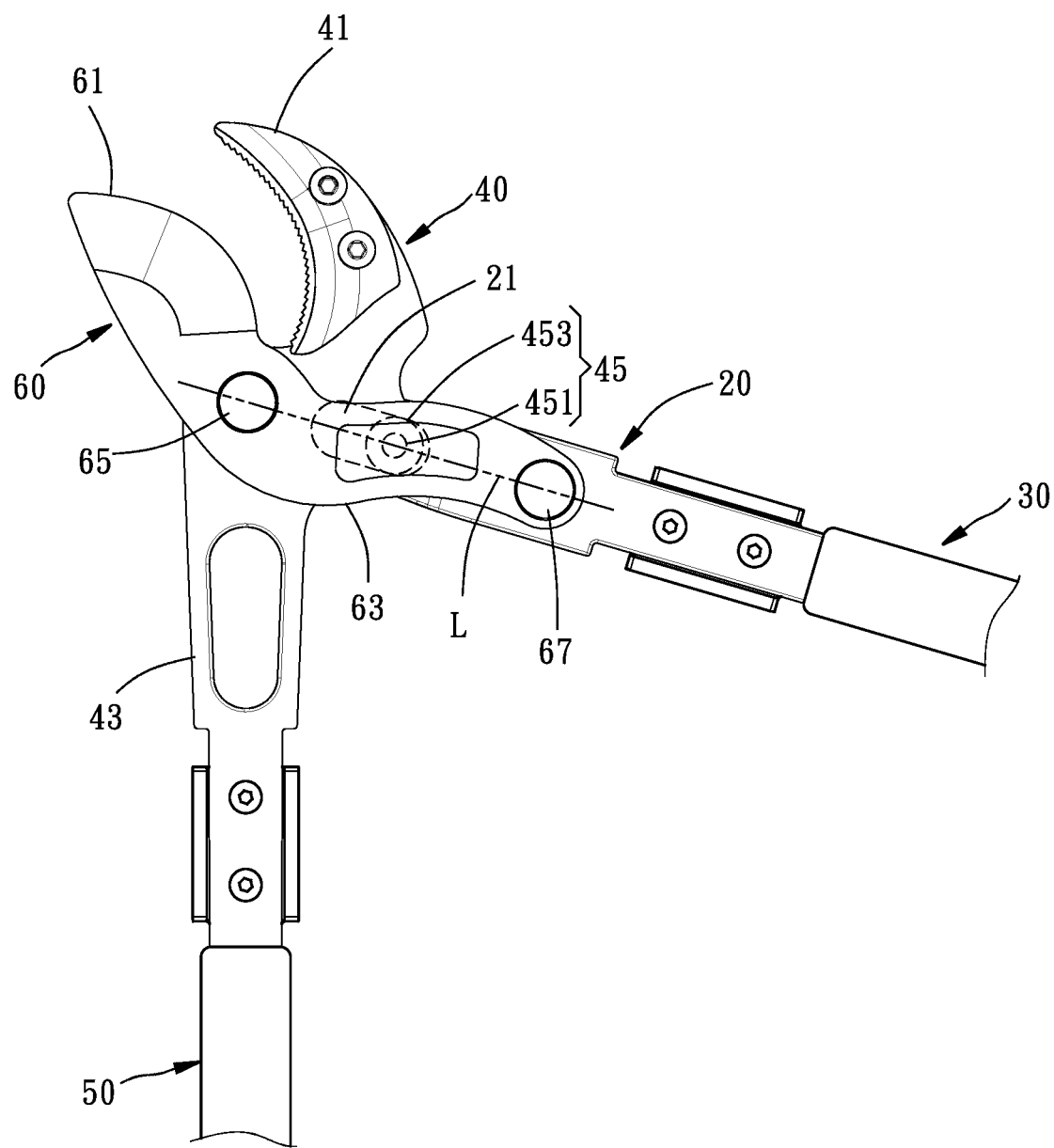
FIG. 4 is a schematic view showing a usage state of the first preferred embodiment of the present invention.
Figure 5:
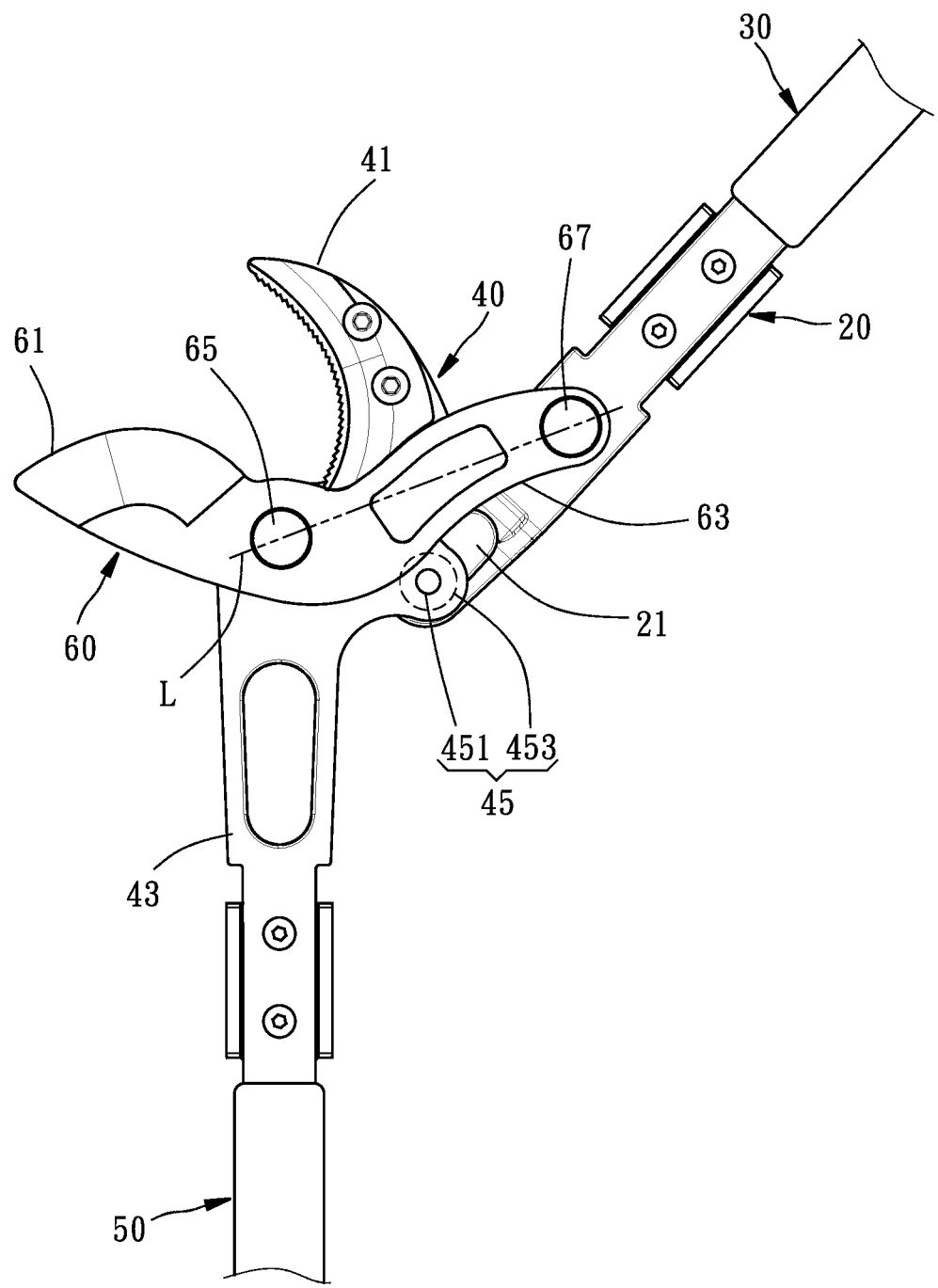
FIG. 5 is a schematic view showing another usage state of the first preferred embodiment of the present invention.

As shown in FIGS. 3-5, when the first handle 30 and the second handle 50 are opened or closed, the axle assembly 45 is movable along the elongated groove 21, and the first shear blade 40 and the second shear blade 60 are opened or closed accordingly. The larger the distance between the axle assembly 45 and the second pivot member 67, the longer the arm of force between the second pivot member 67 and the axle assembly 45, and the greater the resulting torque. The user operating the first handle 30 and the second handle 50 under the condition with relatively greater torque can save effort certainly. In this preferred embodiment, as shown in FIGS. 3-5, an imaginary straight line L is defined connecting the center of the first pivot member 65 and the center of the second pivot member 67. When the first handle 30 and the second handle 50 are in a closed state, the axle assembly 45 is located by a side of the imaginary straight line L, and this side is defined as the outside. When the first handle and the second handle 50 are in an opened state, the axle assembly 45 is moved along the elongated groove 21 of the shank 20 in the direction of approaching the second pivot member 67, and the axle assembly 45 is moved from the outside of the imaginary straight line L toward the other side of the imaginary straight line L, and this side is defined as the inside. When the center of the axle assembly 45 is moved to the inside of the imaginary straight line L, the axle assembly 45 is moved along the elongated groove 21 of the shank 20 in the direction of leaving the second pivot member 67.

It can be known from the above structural description that when the gardening shears 10 of the present invention is not in use, the axle assembly 45 is located at the top end of the elongated groove 21, as shown in FIG. 3. When the user applies force to the first handle 30 and the second handle 50 to open them outwardly, the axle assembly 45 is moved along the elongated groove 21 of the shank 20 in the direction of approaching the second pivot member 67. When the center of the axle assembly 45 is located on the imaginary straight line L as shown in FIG. 4, the axle assembly 45 is located at the bottom end of the elongated groove 21. As shown in FIG. 5, when the first and second handles 30 and 50 continue being opened by the force, the center of the axle assembly 45 is moved to the inside of the imaginary straight line L. and meanwhile the axle assembly 45 continues being moved along the elongated groove 21 of the shank 20 in the direction of leaving the second pivot member 67. Until the first blade portion 41 and the second blade portion 61 are opened to the maximum, the axle assembly 45 and the second pivot member 67 have the longest distance therebetween, which means the arm of force is the longest and the resulting torque is relatively greater during the shear.

When the shears cut a branch relatively larger in diameter, as shown in FIG. 5, the axle assembly 45 and the second pivot member 67 have the longest distance therebetween, which means the arm of force is the longest to bring the condition with the greatest torque. Therefore, the user can apply relatively smaller force to cut the branch relatively larger in diameter, so that the effort-saving effect is attained. When cutting the branch, the user applies force to the first handle 30 and the second handle 50 to close them inwardly. As shown in FIG. 5 to FIG. 3, the axle assembly 45 is firstly moved along the elongated groove 21 of the shank 20 in the direction of approaching the second pivot member 67 and then moved in the direction of leaving the second pivot member 67, so as to make the first blade portion 41 and the second blade portion 61 completely closed to attain the objective of pruning the branch.

Accordingly, the present invention provides a gardening shears having an effort-saving structure, which has the technical feature that the axle assembly 45 moving along the elongated groove 21 of the shank 20 can change the torque produced by the force applied on the handles during operation to save the user effort, thereby having convenience in use.

Figure 6:
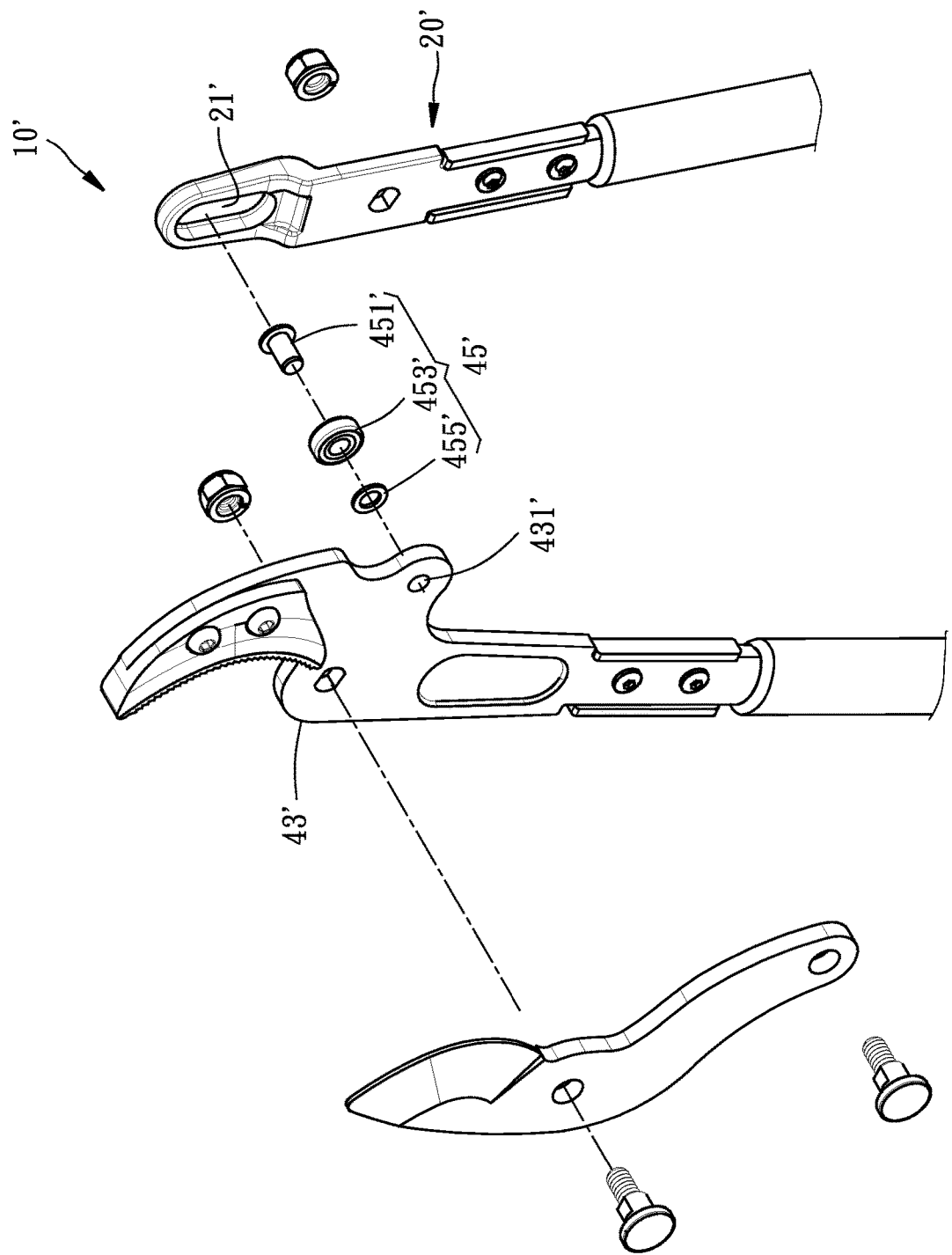
FIG. 6 is an exploded view of a second preferred embodiment of the present invention.

As shown in FIG. 6, the primary structure of a gardening shears 10' having an effort-saving structure of a second preferred embodiment of the present invention is approximately the same with the first preferred embodiment, but has the following difference.

The axle assembly 45' is composed of a pin 451', a bearing 453' and a washer 455'. The pin 451' is inserted through the bearing 453' and the washer 455', and then fixed to a through hole 431' of the first shank portion 43' at a position near the top end of the first shank portion 43' in a tight fit manner. The outer diameter of the bearing 453' is a little smaller than the width of the elongated groove 21' so that the bearing 453' is just able to be accommodated in the elongated groove 21' and thereby the effect of the axle assembly 45' moving along the elongated groove 21' of the shank 20' is achieved. Therefore, the axle assembly 45 is unlimited to the type provided in the preferred embodiments of the present invention. Besides, the arrangement of the bearing 453' is also effective in reducing the wear during moving along the elongated groove 21' and making the cutting action relatively smoother.

As a result, it can be seen that the second preferred embodiment of the present invention can not only achieve the effect of moving the axle assembly along the elongated groove of the shank to achieve the change of the torque produced by the force applied on the handles during operation to save the user effort, but also reduce wear to increase the life time of the shears of the present invention and make the cutting action relatively smoother.

What is claimed is:
1. A gardening shears comprising:
a shank provided near a top end thereof with an elongated groove;
a first handle connected to a bottom end of the shank;
a first shear blade having a first blade portion and a first shank portion, a bottom end of the first blade portion being connected with a top end of the first shank portion, the first shank portion being provided near the top end thereof with an axle assembly, the axle assembly being located in the elongated groove of the shank;
a second handle connected to a bottom end of the first shank portion; and
a second shear blade having a second blade portion and a second shank portion, the second shank portion extending from a bottom end of the second blade portion, a part of the second shank portion located near a top end of the second shank portion being pivotably connected with a part of the first shank portion located near the top end of the first shank portion by a first pivot member, another part of the second shank portion located near a bottom end of the second shank portion being pivotably connected with the shank by a second pivot member;
wherein when the first handle and the second handle are opened or closed, the axle assembly is moved along the elongated groove of the shank, and the first shear blade and the second shear blade are opened or closed accordingly;

wherein an imaginary straight line is defined connecting a center of the first pivot member and a center of the second pivot member; when the first handle and the second handle are in a closed state, the axle assembly is located by a side of the imaginary straight line; when the first handle and the second handle are in an opened state, the axle assembly is moved along the elongated groove of the shank in a direction of approaching the second pivot member, and the axle assembly is moved from said side of the imaginary straight line to another side of the imaginary straight line.

2. The gardening shears as claimed in claim 1, wherein the axle assembly is composed of a screw member and a ring member; the screw member is inserted through the ring member and screwed into the first shank portion at a position near the top end of the first shank portion; the ring member is rotatable relative to the screw member and a diameter of the ring member is smaller than a width of the elongated groove so that the ring member is just able to be accommodated in the elongated groove.

3. The gardening shears as claimed in claim 1, wherein the axle assembly is composed of a pin, a bearing and a washer; the pin is inserted through the bearing and the washer and fixed to a through hole of the first shank portion at a position near the top end of the first shank portion in a tight fit manner; an outer diameter of the bearing is smaller than a width of the elongated groove so that the bearing is just able to be accommodated in the elongated groove.

\* \* \* \* \*